United States Patent Office 3,015,018
Patented Dec. 26, 1961

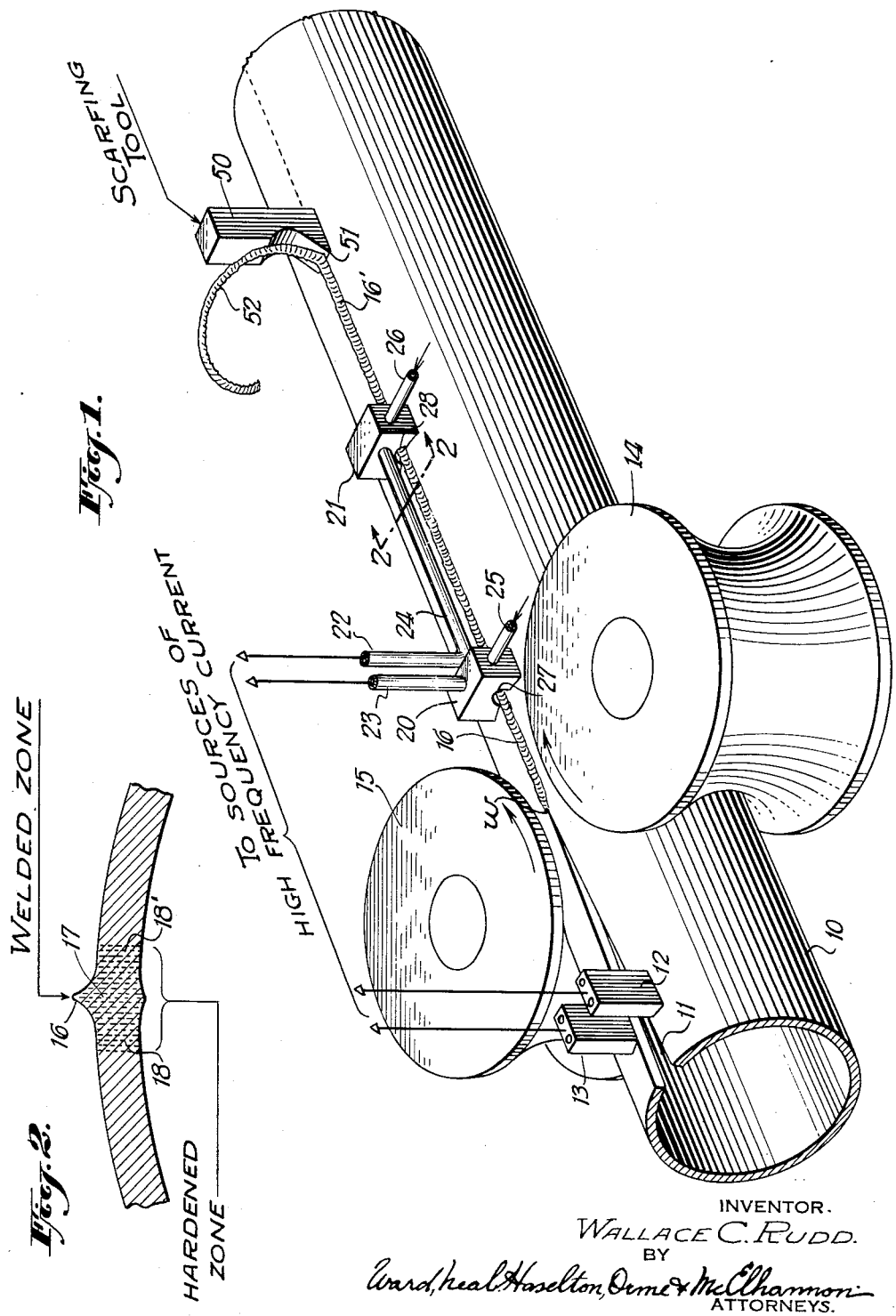

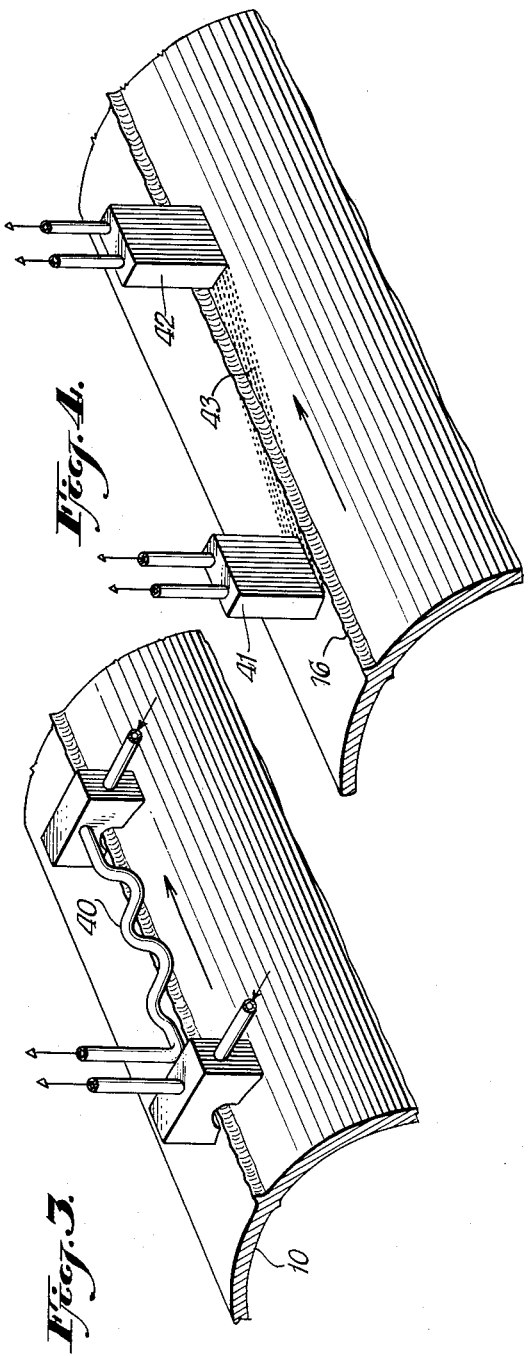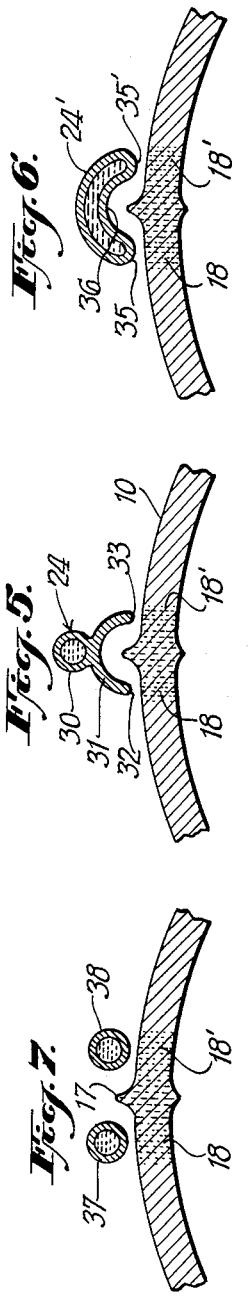

3,015,018
HEATING APPARATUS
Wallace C. Rudd, Larchmont, N.Y., assignor to Magnetic Heating Corp., New Rochelle, N.Y., a corporation of New York
Filed July 13, 1959, Ser. No. 826,555
2 Claims. (Cl. 219—67)

This invention relates to the welding together of metal portions and to the annealing of zones adjacent the weld which have become hardened during the welding. The invention further concerns such annealing and, preferably while the metal is still hot, the scarfing away of the metal which has been upset at the line of the weld. More particularly the invention concerns the effecting of such welding and annealing, and preferably also the scarfing step, as a continuous and substantially unitary operation, and the use of high frequency electrical current for effecting such welding and annealing.

A presently highly successful method of welding metal portions together involves continuously advancing such portions with a V-shaped gap therebetween and with the portions pressed together at the apex of such gap where the weld point occurs, and while the opposite edges of the gap in advance of the weld point are heated to welding temperature by the application of contacts thereto respectively in advance of the weld point, so connected to a source of high frequency current that such current flows from the contacts respectively to and from the weld point along on the approaching edge surfaces. United States Letters Patent to Wallace C. Rudd and Robert J. Stanton No. 2,818,488, granted December 31, 1957, discloses methods and apparatus for this purpose. Other embodiments of methods and apparatus for accomplishing such welding by the use of high frequency current conductively applied are disclosed in United States Letters Patent of said patentees, No. 2,857,503, granted October 21, 1958; and United States Letters Patent of Wallace C. Rudd, No. 2,873,353, granted February 10, 1959, discloses methods and apparatus for welding helically formed tubing by the use of such high frequency heating current conductively applied.

While highly satisfactory welds may be made by the methods and apparatus above referred to, yet in case certain metals are being welded, such as stainless steel, high carbon steel and various alloy steels, the heating thereof during this particular method of welding will be such that a hardened zone will tend to be formed in the metal beginning at the line of the weld, and extending across the heated area in both lateral directions, and accordingly, if the welded object is to be used that brittleness would be objectionable at such hardened zone and particularly if this method of welding is used for welding together the edges of a gap in the forming of metal tubing, it will be highly desirable in some manner to anneal this hardened zone if the tubing is to be further worked, as by being drawn down to desired sizes and shapes. While it is, of course, possible to accomplish such annealing by various methods such as by placing the tubing or other welded parts in a furnace for heat treating, yet this ordinarily will require a relatively prolonged period of treatment, as well as inconveniences in charging the workpieces into and removing same from the furnaces as a separate operation. Also, the annealing might be accomplished by induction heating by placing a high frequency induction coil adjacent the hardened zones for heating same, for example shortly after the welding step, to a temperature which would, of course, be less than the welding temperature. But while such induction methods of heating for the purpose may be advantageous over furnace heat treatment, nevertheless such induction methods have certain serious shortcomings. For example, the induction heating coil would have to be placed quite close to the metal of the hardened zones so as to heat same efficiently, yet if the welded tubing or other welded metal portions are being advanced at a considerable speed, they may tend to vibrate or jump from the desired predetermined path of travel and cause short-circuiting of the induction heating means, or cause variations in the degree of the resulting heating, due to variations in the degree of coupling between the induction heating coil and the work.

According to the present invention, the above-noted difficulties are overcome by a novel and highly efficient method, which makes possible a high degree of uniformity in the annealing treatment. According to the present invention, the welded workpiece, shortly after advancing through the welding station and being welded in accordance with the methods of one or another of the above-mentioned patents, is passed through an annealing or normalizing station where high frequency current is again conductively applied to heat to annealing temperature said zone extending along each side of the line of the weld and which became hardened during the high frequency welding step. By this method of annealing, utilizing high frequency heating current, the hardened zone may be very quickly heated to the desired annealing temperature, while some considerable amount of heat still remains therein as the result of the preceding high frequency welding step. Furthermore, in the ways hereinafter described, the high frequency heating for annealing may be quite closely, and thus with high efficiency, largely confined to the particular hardened zone which is to be annealed. Furthermore, the method of the invention has the important advantage that immediately after the annealing step, as the work is advanced, the welded zone may be engaged by a scarfing tool for scarfing away the upset metal at the line of the weld, while such metal is still hot as the result of the annealing step.

Various further and more specific objects, features and advantages of the invention will appear from the description given below, taken in connection with the accompanying drawings, illustrating by way of example preferred forms of the invention.

In the drawings:
FIG. 1 is a perspective view showing somewhat schematically an arrangement of apparatus for carrying out the welding, annealing and scarfing steps in accordance with the invention;
FIG. 2 is a sectional view, taken substantially along the line 2—2 of FIG. 1 and showing where the weld line and the hardened zone occur at either side thereof in the advancing workpiece;
FIGS. 3 and 4 are perspective views, partly broken away, showing an alternative embodiment of apparatus for practicing the annealing step of the invention; and
FIGS. 5, 6 and 7 are cross-sectional views taken at a position such as at the line 2—2 of FIG. 1, but showing alternative embodiments of high frequency conductor portions which may be used to concentrate at the desired places the heating current for the annealing step.

As shown in FIG. 1, a length of tubing 10 is being continuously advanced in the direction indicated by the arrow, while a longitudinal seam thereon is being welded at the weld point indicated at $w$ and at the apex of a V-shaped gap 11. In advance of the weld point, contacts as at 12 and 13, which are connected to a source of high frequency current, are applied respectively to opposite sides of the gap, so that the high frequency heating current flow is closely concentrated along on the opposed gap surfaces from the contacts to and from the weld point. The metal portions to be welded are pressed together at the weld point as by rollers 14, 15. It will be understood that the metal portions to be welded may comprise strips, bars or the like, as well as portions along the edges of a gap in tubing, and the line of the weld may be either longitudinally of the workpiece, or in other directions, such as a helical shape for example. The welding step as performed in this way is further disclosed in the above-mentioned U.S. Patent No. 2,818,488. The high frequency welding step may, if desired, also be performed in accordance with the methods disclosed in the above-mentioned U.S. Patents 2,857,503 and 2,873,353. It will be understood that the weld may be either in the form of a butt weld or a lapped weld. Usually if the weld is a butt weld or the like, there will be an upset ridge formed, as indicated at 16 in FIGS. 1 and 2, and ordinarily it will be desirable to scarf away such upset metal.

The normal welding temperature in the case of the steel alloys such as above mentioned, may be in the neighborhood of 2500° F., and by the use of the high frequency welding methods above referred to, substantially only the edge surfaces which are to be welded are heated to such actual welding temperature at the zone indicated at 17 in FIG. 2. But along said welded zone, a hardened zone, extending to the portion indicated at 18, 18', will be established by reason of the welding heat, in case the work is formed of steel materials, such as above mentioned, and to avoid brittleness at such hardened zone, same are, in accordance with the invention, normalized or annealed by re-heating same to a temperature in the range of from about 1000° F. to 1600° F. by high frequency apparatus such as indicated at the middle portion of FIG. 1, as the work is continuously advanced, and preferably shortly subsequent to the weld point. The particular means, as shown in FIG. 1, for high frequency annealing, may be generally similar to the means for high frequency welding as shown in FIG. 1 of the above-mentioned U.S. Patent No. 2,857,503, but preferably with certain modifications and with the heating current so adjusted that it will cause heating of the hardened zones only to annealing temperature, as distinguished from heating same up to welding temperature. As here shown, this equipment may comprise first and second contacts as at 20, 21 for engaging the work successively at spaced-apart locations, these contacts being connected to a source of suitable high frequency current by conductors 22 and 23, conductor 22 extending from close to conductor 23, along close to the workpiece as at 24 and to the contact 21 to complete a circuit from conductor 22 through conductor portion 24, contact 21, thence along on the metal of the workpiece at the welded zone and to contact 20, and finally back to the source by way of conductor 23. Since the conductor portion 24 extends along close to the line of the weld on a workpiece, the mutual inductance between the current thereon and the current flowing along on the workpiece in the opposite direction at any moment, will cause the latter flow of current to be closely and efficiently concentrated along close to the line of the weld.

As usual with such high frequency apparatus, the contacts and the conductors should be fluid-cooled as by being made hollow for receiving streams of cooling water which may be introduced to the contacts respectively as by conduits 25 and 26, these being in communication with cavities within the contacts, and thence connected with cavities in the conductors 22 and 23.

The undersurfaces of each of the contacts 20 and 21 are preferably formed with channels of arch-shaped cross-section as at 27, 28, so as to allow the ridge at the line of the weld readily to pass therethrough, and also so that electrical contact with the work will be had at each side of the line of the weld and thus to the regions where the hardened zone extends.

The high frequency current used for the annealing step may be of a frequency of the order of 50,000 to 100,000 cycles per second or higher, for example 300,000 to 450,000 cycles or more, and preferably a source of current separate from that used for the welding step is provided. As noted in the above-mentioned patents, the frequency used for the welding step may be of the order of about 100,000 cycles per second or higher. However, for the annealing step, if desired, lower ranges of frequencies may be used, such as down to 10,000 cycles or thereabouts, and the lower frequencies may be preferable in case the metal of the workpiece is relatively thick, whereby, at the lower frequencies, the heating current will more readily penetrate to greater depths. But in the usual case, the high frequency heating effect will penetrate through the depth of the metal of the workpiece, if it is in the nature of sheet material, by reason of rapid thermal conduction, even though a considerable portion of the heating current may tend to be concentrated along on the surface of the work nearest the conductor portion 24.

The conductor portion 24 may be formed with a cross-section such as shown in detail as per the alternative embodiments indicated in FIGS. 5 and 6. In the example shown in FIG. 5, a main or supporting portion of the conductor is indicated at 30, comprising a continuation of the tubular conductor portion 22. On the underside of this portion 30, a portion of inverted crescent- or channel-shaped cross-section as at 31 is brazed or otherwise secured in a position such that its edges 32, 33 will depend close to the hardened zone indicated by the dotted lines at 18, 18'. Thus, by the use of a portion 31 of this shape, the heating of the work to annealing temperature may be very largely concentrated over the entire zone at which the hardening is to be remedied.

Similarly, as shown in FIG. 6, a conductor portion 24' corresponding to the conductor portion 24 above discussed, may be used, which has a tubular cross-sectional shape somewhat similar to that of a crescent and so that portions as at 35 and 35' will depend close to the hardened zone 18, 18', whereas an under central portion 36 will be of arched cross-section allowing the upset metal on the work to pass in adequately spaced relation to the conductor portion 24'.

Alternatively, instead of using a single conductor portion as at 24 or 24', one may use two portions as at 37, 38 in FIG. 7, these being connected electrically in parallel, as well as being positioned parallel to each other, and extending respectively along close to and above the hardened zone which is to be normalized. It will be apparent that with the arrangements schematically shown in FIG. 7, the high frequency current flowing in the two portions 37 and 38 at any instant, will be flowing in the same direction and thus, by reason of mutual inductance between the currents on the two portions, such currents will be opposed and tend to be caused to spread away from the surfaces thereon closest to the welding zone 17, as may usually be desirable in order to concentrate the heating at the desired zone 18, 18'.

Another alternative embodiment is shown in FIG. 3, which may be like that of FIG. 1, except that, instead of the conductor portion as at 24, there is here shown a conductor portion 40 of sinuous or zig-zag shape so that parts thereof extend to either side of the line of the weld over the zone to be annealed or normalized.

Still another possible embodiment is shown in FIG. 4, which also, if desired, may be similar to that of FIG. 1, except that here, the first of the contacts, as at 41, is located shortly to one side of the line of the weld 16, whereas the second contact 42 is positioned at the other side of the line of the weld. Here the current flowing in or on the metal of the workpiece will flow along a path such as indicated by dotted lines at 43, that is to say, a somewhat diagonal path which crosses over each succeeding portion of the advancing welded seam. If desired, with the arrangement of FIG. 4, it will be understood that the conductor portions leading to the contacts may include portions like those of any of the various other figures above described.

As further shown in FIG. 1, at a point shortly subsequent to the annealing zone, a scarfing tool as at 50 may be suitably and preferably adjustably mounted so that its sharp edge at 51 will engage the upset portion of the metal as at 16' along the line of the weld and scarf away such upset metal, as indicated at 52. Such scarfing operation heretofore has presented serious difficulties, particularly in the case of welded hard or tough ferrous metal stock if the scarfing step is to be undertaken after the metal has become cool. However, with the relationship of the parts shown in FIG. 1, where the scarfing tool is located shortly after the metal has become heated at the annealing zone, such difficulties are easily overcome, since at this location the metal will still be hot, at a temperature for example in the neighborhood of 1000° F. or higher, and hence soft enough for the scarfing tool effectively to cut away the upset portion, whereby the surface of the zone of the weld will become substantially flush with the adjacent metal of the workpiece.

The invention has been found to be successfully operable for the welding of a variety of steels in tubular and strip form, for example stainless steel of the type known in the trade as "400 Series" and high carbon steels known in the trade under the numbers 1030, 1040, 1050 and 1090 and hardenable alloy steels known under the number 6140, these all being cited merely by way of examples. The invention may also be of utility in connection with the welding, annealing and scarfing of metals other than steels.

Although certain particular embodiments of the invention are herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Apparatus for annealing a metal workpiece which comprises two metal portions which have been welded together along the line of a welded seam in such manner that a relatively hardened region has been formed therein and extends along the seam, said apparatus comprising in combination: means for continuously advancing the workpiece in a direction generally longitudinally of the seam; a pair of contacts for respectively engaging the advancing workpiece at successive locations; a source of high frequency current; and conductors for connecting the terminals of said source to said contacts, said conductors including conductor portions electrically connected in parallel and which extend along in closely-spaced relation to the advancing welded seam at each side of the seam respectively.

2. Method for annealing a metal workpiece which comprises two metal portions which have been welded together along the line of a welded seam in such manner that a relatively hardened region has been formed therein and extends along adjacent both sides of the seam, and for also scarfing away metal upset along the welded seam, which method comprises: continuously advancing the workpiece longitudinally of the welded seam past an annealing station and then past an adjacent scarfing station; conductively applying to the workpiece by contacts at successive locations of said annealing station heating current of at least radio frequency to flow for a substantial distance longitudinally along on the metal at said hardened region adjacent the seam to reheat such hardened regions, the current being applied to said contacts by conductors and being sufficient to cause annealing of said region as the workpiece passes said annealing station, at least a portion of one of said conductors extending along in closely spaced relation to the upset metal at the welded seam whereby the current path extends from one of said contacts along the welded seam to the other contact and thence back along said conductor portion, such conductor portion acting by reason of mutual inductance to concentrate the current along on said upset metal and adjacent thereto; and, while the metal of the region of the welded seam is still heated to a substantial degree as the result of the annealing step, scarfing away at said scarfing station the metal upset along on the welded seam.

References Cited in the file of this patent
UNITED STATES PATENTS

| | | |
|---|---|---|
| 2,047,254 | Burnish | July 14, 1936 |
| 2,857,503 | Rudd | Oct. 21, 1958 |
| 2,898,440 | Rudd | Aug. 4, 1959 |